Figure 1:
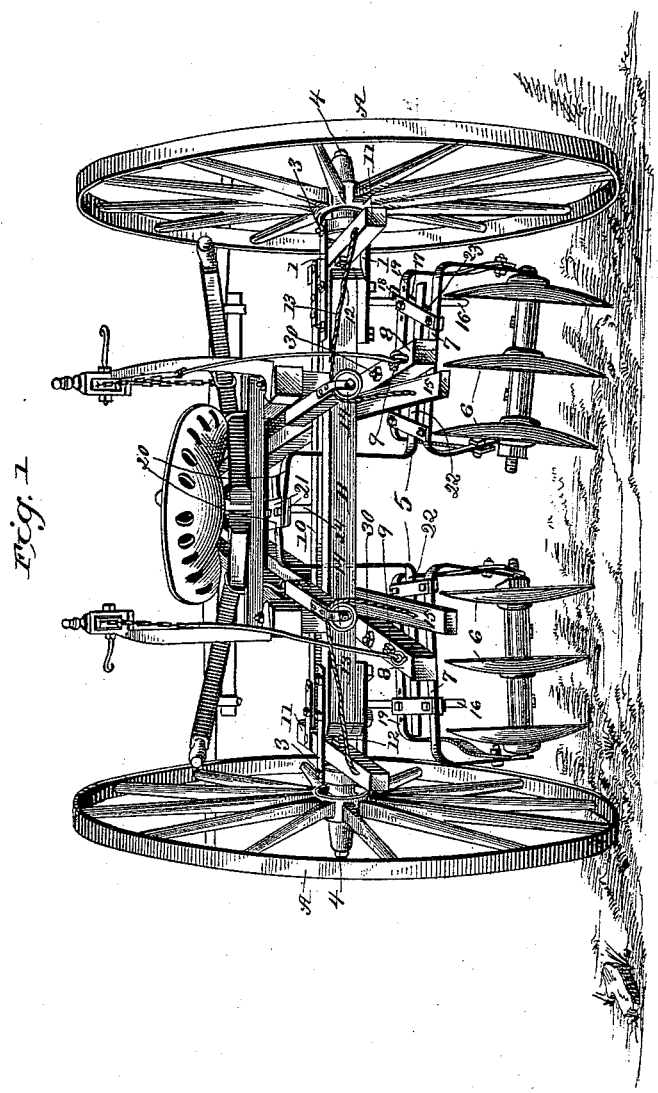

(No Model.)  R. K. SWIFT.  2 Sheets—Sheet 1.

DISK CULTIVATOR.

No. 379,295.　　　　　Patented Mar. 13, 1888.

WITNESSES:
Edwin T. Yewell.
Jos. A. Ryan.

INVENTOR.
R. K. Swift.
By Manahan & Ward,
his Attorneys.

(No Model.) 2 Sheets—Sheet 2.

R. K. SWIFT.
DISK CULTIVATOR.

No. 379,295. Patented Mar. 13, 1888.

WITNESSES:
Edwin I. Yewell,
Jos. A. Ryan

INVENTOR,
R. K. Swift,
By Manahan & Ward,
his Attorneys.

UNITED STATES PATENT OFFICE.

R. K. SWIFT, OF ROCK FALLS, ILLINOIS, ASSIGNOR OF TWO-THIRDS TO JOHN J. A. ZELLER AND LYMAN E. PHELPS, BOTH OF SAME PLACE.

DISK CULTIVATOR.

SPECIFICATION forming part of Letters Patent No. 379,295, dated March 13, 1888.

Application filed October 19, 1887. Serial No. 252,842. (No model.)

*To all whom it may concern:*

Be it known that I, R. K. SWIFT, a citizen of the United States, residing at Rock Falls, in the county of Whiteside and State of Illinois, have invented certain new and useful Improvements in Disk Cultivators, of which the following is a description.

My invention has reference to certain improvements in disk cultivators, and pertains more especially to certain novel mechanism adapted to assist the lateral shifting of the gangs, and, second, to a simple provision for maintaining a uniformity of depth of cut of the several disks.

My invention is more especially advantageous and necessary when the implement is used in the cultivation of corn.

As is well known, nearly all of the corn is planted in what is known as "check-rows," so as to be cultivated in two directions perpendicular to each other. The rows in the direction in which the corn is planted are reasonably straight, and the hills therein in a fair degree of alignment; but the cross-rows are unavoidably more or less crooked, and the hills therein more or less zigzag or out of line. It is therefore understood to be a necessity in corn-cultivating implements that there should be some provision for shifting the cultivators laterally while in motion, in order to adapt them to the change of direction occasioned by the crookedness of these cross-rows. With the ordinary shovel cultivators these lateral movements have been accomplished in various modes, which generally consist in merely moving the shovels laterally. As the shovels in question present only their edge laterally, they cut their way in moving laterally in the earth; but in the implement in which the ground-stirrers are rotating disks the lower portion of each disk is inserted more or less in the earth and presents its broad side against any lateral movement, so that to move the gangs laterally would require a force sufficient to move the earth at the side of each disk to the depth that the latter penetrates, and this is simply impracticable, if not impossible. In order to readily deflect the disks laterally it is necessary to change the direction of their progression, or, in other words, to twist each gang of disks laterally, so that the cut of the disks shall be in the direction in which it is desired to shift the gangs. In order to accomplish this it will greatly conduce to the result to at the same time change the carrying-wheels of the implement and in the same direction and to the same degree as the cutting-disks are shifted, as aforesaid.

Figure 2:
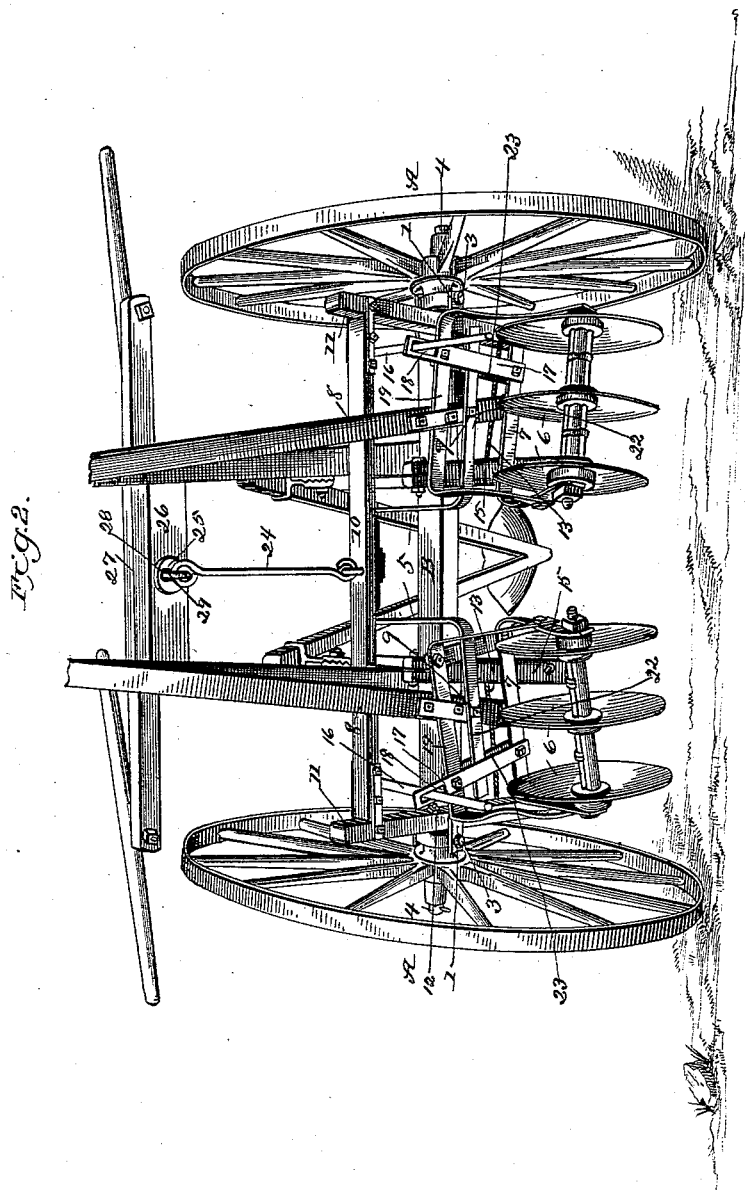

In the drawings, Figure 1 is a rear elevation in perspective of a machine embodying my invention. Fig. 2 is a perspective from the front of the machine, with the latter tilted backward and upward, so as to exhibit the parts located under the carrying-axle.

A A are the carrying-wheels, which, through the medium of the axle B, support the machine. The wheel A is seated on the axle B as follows: Horizontal bars 1 are projected outward from the end of the axle B, being fastened, respectively, on the top and bottom of the latter, and at their outer ends the bars 1 are provided with vertical holes, through which are passed the vertical bolts 3, which bolts 3 also pass down through the inner end of the spindle 4, upon which the wheels A rotate, whereby the spindles 4 and wheels A are furnished with a horizontally-pivoted seat, and thus adapted to be deflected laterally in order to change the direction of said wheels.

The frames 5 5 support and control the disks 6 6. Each frame 5 is pivoted at the center of its rear cross-beam, 7, to the usual converging beams, 8, by means of the vertical bolt 9, and thus adapted to be oscillated laterally on said bolt 9 as a pivot.

Draft is applied to the forward center of a three-sided frame consisting of the front cross-beam, 10, and side beams, 11. The front ends of beams 11 are suitably pivotally attached to the outer ends, respectively, of the cross-beam 10. The side beams, 11, are rigidly attached near their centers to the inner end of the spindles 4 by means of horizontal bolts 12.

To the rear end of the side beams, 11, is attached the usual rope or chain, 13, which, passing over a suitable supporting-pulley, 14, is attached at its inner end to the usual treadles, 15, which are located within convenient reach of the driver's foot when he is seated on the machine. It is obvious that the pressure of the driver's foot upon one of the treadles 15 will serve to draw inward the rear end of the side beam, 11, to which said treadle is attached. Through the medium of the front cross beam, 10, the same deflection will be imparted to the opposite side beam, 11, and the same direction and degree of deflection will be given to each of the carrying-wheels A, and a like pressure upon the other treadle 15 will have the effect of deflecting the carrying-wheels A and front beam, 10, and the side beams, 11, in the opposite direction. Therefore the driver has it in his power, by treading on one or the other of the treadles 15, to instantly change the direction of the carrying-wheels A, as may be desired.

To cause the frames 5 to be deflected coincidently with the aforesaid deflections of the carrying-wheels A, a vertical rod, 16, is projected downward from the cross-beam 10, near the outer end of the latter, and through a plate, 17, rigidly attached to and projected in front of each of the frames 5, and provided with a slot, 18, through which slot the rod 16 projects. Thus the lateral oscillation in the cross-beam 10, before described, will be communicated through the rod 16 to the front of the frames 5, respectively, and cause the latter to change direction coincidently with that of the carrying-wheels A. The frames 5 turn on their bolt 9 as their pivot, and are held and guided at their forward end by the front cross-bar, 19, which slides laterally in suitable ways formed on the under side of the beams 8.

The inner ends of the transverse bars 20 are lapped over each other in a horizontal position and held adjustably by means of the clip 21. The bars 20 are intended to be high enough at their point of mutual attachment in the clip 21 to be above the row of corn which is straddled by the implement. The bars 20 have a vertical center and have their lower portions projected outwardly in a horizontal position. The horizontal portions 22 of the bars 20 are inserted in suitable horizontal slots, 23, formed in any suitable way on the upper portion of the frames 5, and serve to hold the latter parallel with the surface of the ground, there being a disposition on the part of the disk-gangs to tilt upward at their outer ends. The horizontal part 22 of bars 20 is bolted to the under side of the beam 8 by means of vertical bolts 30.

In the clip 21 are furnished the usual holes and vertical bolts for widening or contracting the bars 20, and thereby changing the interval between the gangs of disks, the front ends of beams 8 having the usual hinge-connection.

The necessary play of the cross-beam 10, involved in the lateral adjustment aforesaid, is afforded by attaching the draft-iron 24 at its rear end directly centrally to said beam 10 and attaching the forward end of said draft-iron to the clevis 25, which clasps the cross-beam 26 and the center of the whiffletree 27. A longitudinal slot, 28, in the cross-beam 26, through which the clevis-pin 29 is inserted, permits the required longitudinal movement of the clevis 25 and draft-iron 24, made necessary by the lateral oscillation or the change of position of the cross-beam 10, and at the same time, the draft-iron being thus attached centrally to said beam 10, the draft of the team serves to assist the operator in restoring the frames 5 to their normal position.

What I claim as my invention, and desire to secure by Letters Patent of the United States, is—

1. In a disk cultivator, the combination, with the axle, of a flexible wheel-frame having the wheel-spindles rigidly attached thereto, a vertically-pivoted frame carrying the disk-gangs and suspended from said wheel-frame, and means, substantially as shown, for imparting lateral oscillation coincidently to both of said frames, as and for the purpose specified.

2. The combination of the frames 5, adapted to support and control the gangs of disks 6 and pivoted above the axis of rotation of said disks, the plates 17, attached to said frames and provided with the slots 18, the beam 10, provided with the vertical bar 16, adapted to engage the slot 18, side beams, 11, suitably pivoted to oscillate laterally, and means, substantially as shown, for effecting said oscillation, for the purpose described.

3. The combination of the axle B, carrying-wheels A A, spindles 4, side beams, 11, attached to said spindles, cross-beam 10, provided with the vertical bar 16, frames 5, adapted to support and control, respectively, the gangs of disks 6 and provided with the plate 17 and slot 18 therein, beams 8, and suitable means for imparting lateral oscillation to the beams 11, substantially as shown, and for the purpose described.

4. In combination with the wheel-frame and tongue and the frames 5 5, the bars 20, adjustably connected at their inner ends to said tongue and having their lower and horizontal portions, 22, bolted to the plow-beams and inserted in ways or slots 23, formed in a horizontal plane on the frames 5, substantially as shown, and for the purpose described.

5. In a disk cultivator, the combination of the frames 5 5, adapted to support and control, respectively, the gangs of disks 6 6 and pivoted in a horizontal plane, the superposed frame 10 11, attached laterally to the spindles 4, the axle B, spindles 4, pivotally attached thereto, the carrying-wheels A, interattachment of the frame 10 11, and frames 5, and means, substantially as shown, for imparting lateral oscillation to the frame 10 11, whereby both the carrying-wheels and the gangs of disks are coincidently and in the same degree deflected laterally, as described, substantially as shown, and for the purpose specified.

6. In a disk cultivator, the combination of the axle B, horizontal bars 1, projected outwardly therefrom in pairs and provided with vertical holes 2, the flexible frame 10 11, the wheel-spindles 4, rigidly secured to the side bars of the flexible frame, and means, substantially as shown, for laterally oscillating said frame, for the purpose described.

7. The combination of the frames 5 5, suitably pivoted near their rear ends and provided with two or more slots, 23, and the laterally-adjustable bars 20, provided with the horizontal portions 22, seated within the slots 23, substantially as shown, and for the purpose described.

In witness whereof I have hereunto affixed my name in the presence of two witnesses.

R. K. SWIFT.

Witnesses:
JOHN G. MANAHAN,
NELSON SMITH.